(12) United States Patent
Gupta

(10) Patent No.: US 8,352,557 B2
(45) Date of Patent: Jan. 8, 2013

(54) MESSAGE FILTERING SYSTEM

(75) Inventor: Shekhar Gupta, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 477 days.

(21) Appl. No.: 12/189,565

(22) Filed: Aug. 11, 2008

(65) Prior Publication Data
US 2010/0036918 A1 Feb. 11, 2010

(51) Int. Cl.
G06F 15/16 (2006.01)
(52) U.S. Cl. ........................ 709/206; 709/200; 455/466
(58) Field of Classification Search .................. 709/206, 709/200; 455/466
See application file for complete search history.

(56) References Cited

U.S. PATENT DOCUMENTS

| | | | | |
|---|---|---|---|---|
| 6,393,464 B1* | 5/2002 | Dieterman | ..................... | 709/206 |
| 6,615,242 B1* | 9/2003 | Riemers | ..................... | 709/206 |
| 6,732,157 B1* | 5/2004 | Gordon et al. | ................. | 709/206 |
| 7,174,453 B2* | 2/2007 | Lu | ..................... | 713/154 |
| 7,302,272 B2 | 11/2007 | Ackley | | |
| 7,487,132 B2* | 2/2009 | Auvenshine | ..................... | 706/15 |
| 7,636,947 B2* | 12/2009 | Peled et al. | ..................... | 726/30 |
| 7,640,336 B1* | 12/2009 | Lu et al. | ..................... | 709/224 |
| 7,664,819 B2* | 2/2010 | Murphy et al. | ................. | 709/206 |
| 7,693,071 B2* | 4/2010 | Achlioptas et al. | ........... | 370/238 |
| 8,001,609 B1* | 8/2011 | Chan et al. | ..................... | 726/27 |
| 8,099,780 B2* | 1/2012 | Lu | ..................... | 726/22 |
| 8,135,790 B1* | 3/2012 | Castelli | ..................... | 709/206 |
| 2002/0116641 A1* | 8/2002 | Mastrianni | ..................... | 713/201 |
| 2003/0220978 A1* | 11/2003 | Rhodes | ..................... | 709/206 |
| 2004/0093384 A1* | 5/2004 | Shipp | ..................... | 709/206 |
| 2004/0260924 A1* | 12/2004 | Peled et al. | ..................... | 713/166 |
| 2005/0010644 A1 | 1/2005 | Brown et al. | | |
| 2005/0021637 A1* | 1/2005 | Cox | ..................... | 709/206 |
| 2005/0041789 A1* | 2/2005 | Warren-Smith et al. | ... | 379/93.24 |
| 2005/0080854 A1 | 4/2005 | Tervo | | |
| 2005/0149622 A1* | 7/2005 | Kirkland et al. | ............. | 709/207 |
| 2005/0160144 A1* | 7/2005 | Bhatia | ..................... | 709/206 |
| 2005/0256929 A1* | 11/2005 | Bartol et al. | ................. | 709/206 |
| 2006/0031311 A1* | 2/2006 | Whitney et al. | ............... | 709/206 |
| 2006/0041625 A1* | 2/2006 | Chen et al. | ..................... | 709/206 |
| 2006/0059238 A1* | 3/2006 | Slater et al. | ..................... | 709/206 |
| 2006/0174111 A1* | 8/2006 | Burns | ..................... | 713/166 |
| 2007/0016641 A1* | 1/2007 | Broomhall | ..................... | 709/206 |

(Continued)

FOREIGN PATENT DOCUMENTS
WO WO 2005081664 A2 * 9/2005

OTHER PUBLICATIONS
http://www.parentalsoftware.org/cellphone-spy.html; 4 pgs.

(Continued)

Primary Examiner — Kamal B Divecha
Assistant Examiner — Anthony Mejia
(74) Attorney, Agent, or Firm — Swanson & Bratschun, L.L.C.

(57) ABSTRACT

A message filtering system is provided including a message management unit and a message monitoring unit in communication with the message management unit. The message management unit is configured to send and receive message over a network and to route messages to the message monitoring unit based on a message source, and the message monitoring unit is configured to parse the message and locate identifiers in the message and to re-route the message based on the identifier located in the message.

11 Claims, 4 Drawing Sheets

U.S. PATENT DOCUMENTS

| | | | |
|---|---|---|---|
| 2007/0070940 | A1 | 3/2007 | Vander Veen et al. |
| 2007/0071213 | A1* | 3/2007 | Claudatos et al. ....... 379/211.01 |
| 2007/0260603 | A1 | 11/2007 | Tuscano et al. |
| 2008/0064381 | A1 | 3/2008 | Ackley |
| 2008/0070608 | A1 | 3/2008 | Ackley |
| 2008/0070609 | A1 | 3/2008 | Ackley |
| 2008/0114838 | A1* | 5/2008 | Taylor .......................... 709/206 |
| 2008/0162642 | A1* | 7/2008 | Bachiri et al. ................ 709/206 |
| 2008/0165944 | A1 | 7/2008 | Rosenthal et al. |
| 2008/0293383 | A1* | 11/2008 | Rastas ........................ 455/412.1 |
| 2008/0319949 | A1* | 12/2008 | Irving et al. ...................... 707/3 |
| 2009/0006564 | A1* | 1/2009 | Kay et al. ...................... 709/206 |
| 2009/0063133 | A1* | 3/2009 | Auvenshine ...................... 704/9 |
| 2009/0083385 | A1* | 3/2009 | Heredia et al. ................ 709/206 |
| 2009/0172121 | A1* | 7/2009 | Tanaka ........................... 709/206 |
| 2009/0177750 | A1* | 7/2009 | Lee et al. ....................... 709/206 |
| 2009/0193075 | A1* | 7/2009 | Persinger ..................... 709/203 |
| 2009/0198777 | A1 | 8/2009 | LaFreniere et al. |
| 2009/0198778 | A1* | 8/2009 | Priebe ........................... 709/206 |
| 2009/0228557 | A1* | 9/2009 | Ganz et al. .................... 709/206 |
| 2009/0299927 | A1* | 12/2009 | Chen et al. ....................... 706/14 |
| 2010/0017371 | A1 | 1/2010 | Whalin et al. |
| 2010/0017864 | A1* | 1/2010 | Codignotto ....................... 726/7 |
| 2010/0035639 | A1* | 2/2010 | Gupta et al. ................... 455/466 |
| 2010/0049814 | A1* | 2/2010 | Turakhia ....................... 709/206 |
| 2010/0058178 | A1* | 3/2010 | Dong et al. .................... 715/256 |
| 2011/0258274 | A1* | 10/2011 | Yu ................................. 709/206 |

OTHER PUBLICATIONS http://www.tango.ie/solutions/parentalcontrol.asp; 1 pg.
http://www:anam.com/parentalcontrol.php; 1 pg.
http:///www.adaptivemobile.com/Solutions/listcat/16; 2 pgs.
http://www.spy-mobile-phone.com/sms-spy.html; 5 pgs.
U.S. Appl. No. 12/363,430; Non-Final Rejection dated Jun. 9, 2011; 13 pages.
U.S. Appl. No. 12/363,430; Final Rejection dated Sep. 22, 2011; 11 pages.
U.S. Appl. No. 12/012,151; Non-Final Rejection dated Apr. 28, 2010; 13 pages.
U.S. Appl. No. 12/012,151; Final Rejection dated Oct. 18, 2010; 23 pages.
U.S. Appl. No. 12/012,151; Advisory Action dated Jan. 21, 7011; 6 pages.

\* cited by examiner

MESSAGE FILTERING SYSTEM

BACKGROUND OF THE INVENTION

Use of electronic messaging is growing at exponential rates. As the use of electronic messaging increases, additional risks and dangers are presented which require monitoring large amounts of data for inappropriate communications. The use of electronic messaging is even more concerning when one considers the number of children currently using electronic messaging. As has been well documented in the media, electronic messaging is commonly used by sexual predators and others who look to harm children. Monitoring of electronic messaging by parents is very difficult to do in real time, which results to children being exposed to inappropriate and dangerous information.

Currently, parents who are interested in viewing the electronic messages their children send and receive have limited options. Parents can view old e-mails or text messages directly on the child's communication device. In addition, logging software can save copies of the child's electronic messages on a server or workstation. However, these monitoring devices do not act in real time. Also, the parent is required to read all the text messages generated which is very time consuming. A need exists for a monitoring system which will automatically parse every message a child receives for inappropriate content and to notify parents if inappropriate content is received.

SUMMARY OF THE INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

In one embodiment employing principals of the invention, a message filtering system is provided which includes a message management unit and a message monitoring unit in communication with the message management unit. The message management unit is configured to send and receive message over a network and to route messages to the message monitoring unit based on a message source. In addition, the message monitoring unit is configured to parse the message and locate identifiers in the message and to re-route the message based on the identifier located in the message.

In another embodiment employing the principals of the invention, a method of filtering messages comprising the steps of receiving a message and routing the message based on the message source address, transmitting the message to a message monitoring unit via a network, parsing the message for an identifier, and routing the message based on the identifier located within the message is provided.

In another embodiment employing the principals of the invention, a message monitoring system is provided including a plurality of communication devices and at least one monitoring unit in communication with the communication device. The communication devices are configured to transmit messages over a network and the monitoring unit is configured to intercept messages between at least two communication devices and examine the contents of the messages.

In yet another embodiment employing the principals of the invention, a method of restricting messages from reaching a destination is provided including the steps of intercepting a message between at least two communication devices via a monitoring unit, parsing the message for a identifier, comparing the identifier to a plurality of known identifiers, and preventing delivery of the message based on the identification of a known identifier in the message.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figure 1:
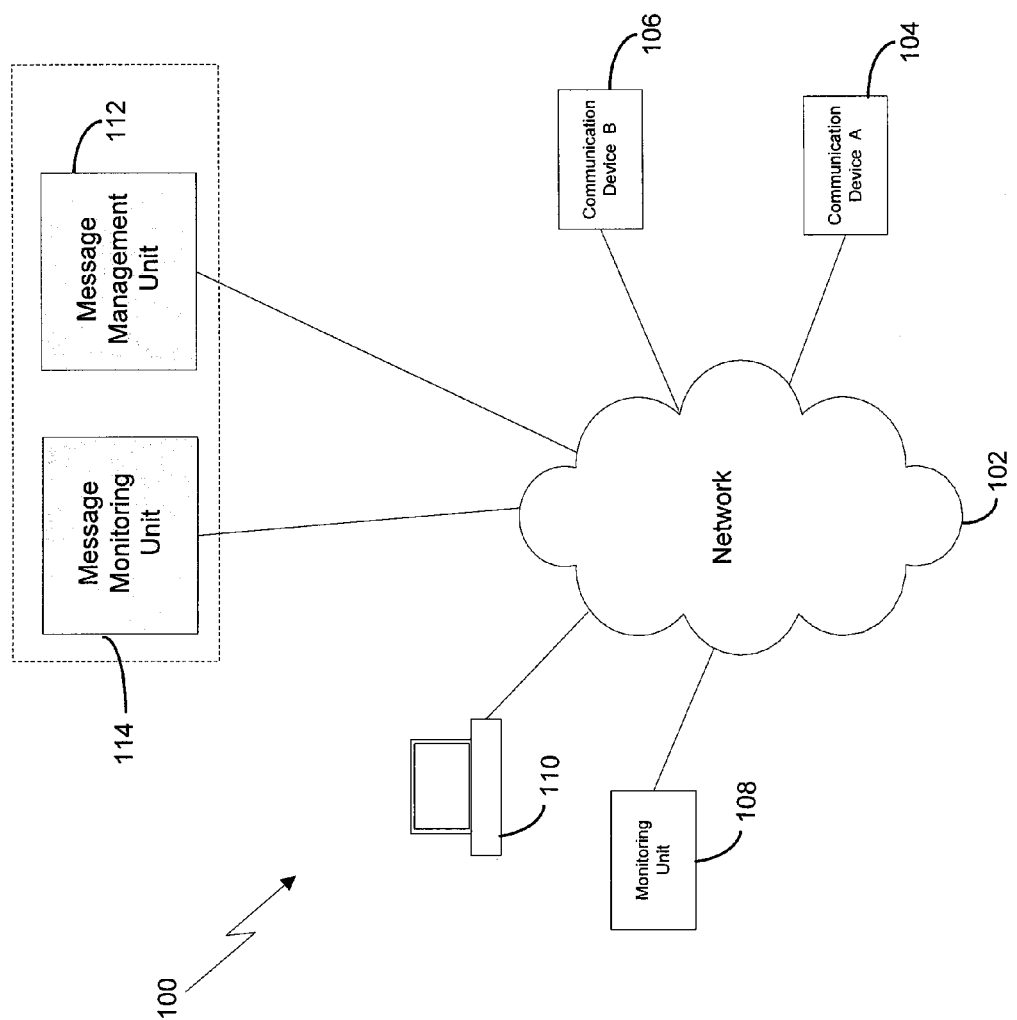
FIG. 1 depicts one embodiment of a message filtering system consistent with the present invention.

Referring now to the drawings which depict different embodiments consistent with the present invention, wherever possible, the same reference numbers will be used throughout the drawings and the following description to refer to the same or like parts.

FIG. 1 depicts one embodiment of a message filtering system 100 consistent with the present invention. The message filtering system 100 includes a network 102, a communication device A 104, a communication device B 106, and a monitoring unit 108. The message filtering system 100 further includes a user terminal 110, a message management unit 112 and a message monitoring unit 114. In general, the message management unit 112 manages and controls the communications traffic of the network 102. The message management unit 112 also routes messages between the communication devices 104 and 106. When the message management unit 112 receives a message from an address of a predetermined communication device 104 and 106 address, it re-routes the message to the message monitoring unit 114. The message monitoring unit 114 compares the contents of the message with identifiers stored in an identifier library. If an identifier in the message matches an identifier in the identifier library, the message is forwarded through the message management unit 112 to a monitoring unit 108. The message monitoring unit 114 requests authorization from the monitoring unit 108 to send the message to the destination address. Further, the terminal unit 110 may allow a user to register monitoring unit 108 addresses, communication device 104 and 106 addresses, communication device 104 and 106 addresses from which messages are restricted, and identifiers into one or more libraries stored on the message monitoring unit 114 or the message management unit 112.

The message monitoring unit 114 and message management unit 112 may be embodied by one or more servers. Alternatively, each of the message monitoring unit 114 and message management unit 112 may be implemented using any combination of hardware and software, whether as incorporated in a single device or as a functionally distributed across multiple platforms and devices.

In one embodiment, the network 102 is a cellular network, a TCP/IP network, or any other suitable network topology. In another embodiment, the message monitoring unit 114 and the message management unit 112 may be servers, workstations, network appliances or any other suitable data storage devices. In yet another embodiment, message monitoring unit 114 and message management unit 112 may be combined into a single server, workstation, network appliance or suitable data storage device. In another embodiment, the communication devices 104 and 106 may be any combination of cellular phones, telephones, personal data assistants, or any other suitable communication devices. In another embodiment, the monitoring unit 108 may be any combination of cellular phones, telephones, personal data assistants, or any other suitable communication devices. In addition, terminal unit 110 may be a server, workstation, network appliance or any other suitable network terminal device.

In one embodiment, the network 102 may be any private or public communication network known to one skilled in the art such as a local area network ("LAN"), wide area network ("WAN"), peer-to-peer network, cellular network or any suitable network, using standard communication protocols. The network 102 may include hardwired as well as wireless branches.

In another embodiment, the message management unit 112 may be configured to restrict messages between communication devices 104 and 106. The message management unit 112 may be configured to store a list of restricted addresses for each communication device 104 and 106. In addition, the message management unit 112 may be configured to store the address of a monitoring unit 108 where messages from restricted addresses have been previously re-routed and denied delivery.

In yet another embodiment, the message monitoring unit 114 may be configured to store a list of words in memory. When a message from a communication device 104 and 106 is received at the message management unit 112, the message management unit 112 may forward the message to the message monitoring unit 114. The message monitoring unit 114 may parse the message for words that match the words stored in the memory of the message monitoring unit 114. If a match is found, the message monitoring unit 114 may re-route the message to the monitoring unit 108 for delivery approval.

In another embodiment, the monitoring unit 108 is configured to allow a user to determine if the message may be forwarded on to the original destination address. If the user declines to send the message to the original address, the message is stored on the message monitoring unit 114 and the message is not sent to the destination address. If the user allows the message to pass through, the message monitoring unit 114 transfers the message to the message management unit 112 which transmits the message to original destination addresses of the communication devices 104 and 106.

As an illustrative example of the operation of the message filtering system 101, communication device A 104 transmits a message to communication device B 106. First, the message may be sent to the message management unit 112. The message management unit 112 compares the address of communication device A 104 with a list of addresses stored in memory to determine if communication device A 104 is a registered or restricted address. If communication device A 104 is restricted from sending messages to communication device B 106, the message may not sent to communication device B 106.

If communication device A 104 is a registered unit, the message management software determines if communication device B 106 is a restricted communication device. If communication device B 106 is a restricted address, the message may be stored on the message monitoring unit 114 and the message is not sent. If communication device B 106 is not a restricted unit, the message may be sent to the message monitoring unit 114 which locates words within the message and compares the words to a library of words on the message monitoring unit 114. If any of the words of the message match a word in the library, the message monitoring unit 114 forwards the message to the monitoring unit 108 in real time.

The monitoring unit 108 displays the message to a user, via the monitoring unit 108, who may be given the option of allowing transmission of the message to communication device B 106 or denying transmission of the message. If the user denies transmission, the message may be stored on the message monitoring unit 114 and may be not sent to communication device B 106. If the user allows transmission, the message may be sent to the message management unit 112 which transmits the message to communication device B 106.

Figure 2:
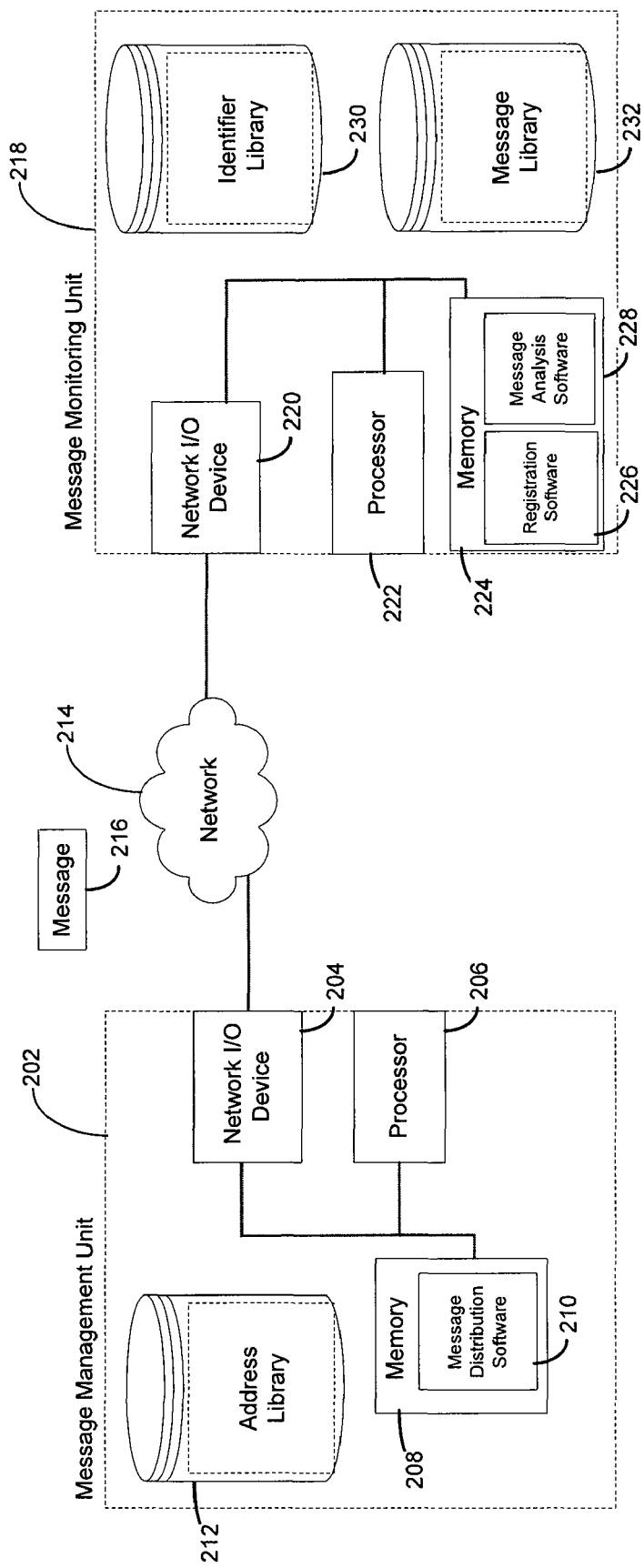
FIG. 2 depicts one embodiment of the message management unit and message monitoring unit consistent with the present invention.

FIG. 2 depicts one embodiment of a message management unit 202 and message monitoring unit 218 consistent with the present invention. The message management unit 202 includes a network I/O device 204, a processor 206, a memory 208 storing message distribution software 210 and an address library 212. The message distribution software 210 running in memory 208 of the message management unit 202 is operatively configured to receive a message 216 from the network I/O device 204 and to extract the sending communication device address as well as the destination communication device address from the message. In addition, the message distribution software 210 is operatively configured to compare the sending communication device address of the message 216 against a list of addresses restricted from sending messages to the destination address. If the sending address is identified in the address library 212, the message is re-routed via the network 214 to the message monitoring unit 218 for further analysis.

In one embodiment, the processor 206 may be a central processing unit ("CPU"), a application specific integrated circuit ("ASIC"), a microprocessor or any other suitable processing device. The memory 208 may include a hard disk, random access memory, cache, removable media drive, mass storage or configuration suitable as storage for data, instructions, and information. In one embodiment, the memory 208 and processor 206 may be integrated. The memory may use any type of volatile or non-volatile storage techniques and mediums. The network I/O line 204 device may be a network interface card, a plain old telephone service ("POTS") interface card, an ASCII interface card, or any other suitable network interface device. The network I/O interface devices 204 and 220 may be a network interface card, a wireless network interface card or any other suitable network interface device. The message distribution software 210 may be a compiled program running on a server, a process running on a microprocessor or any other suitable port control software.

The message monitoring unit 218 includes a network I/O device 220, a processor 222, a memory 224 storing registration software 226 and message analysis software 228, an identifier library 230, and a message library 232. The message analysis software 228 is operatively configured to extract a plurality of identifiers from the body of the message 216. Each identifier extracted is compared to a list of identifiers stored in the identifier library 230. If any one of the identifiers matches an identifier in the identifier library 230, the message 216 is re-routed to a monitoring unit, such as monitoring unit 108 from FIG. 1, via the network I/O device 220. If the monitoring unit allows the message 216 to proceed to the destination address, the authorization is received by the message monitoring unit 218 via the network I/O device 220 and the message 216 is sent to the message management unit 202 via the network 214. If the monitoring unit denies the message 216, the message is stored in the message library 232.

In one embodiment, the processor 222 may be a central processing unit ("CPU"), a application specific integrated circuit ("ASIC"), a microprocessor or any other suitable processing device. The memory 224 may include a hard disk, random access memory, cache, removable media drive, mass storage or configuration suitable as storage for data, instructions, and information. In another embodiment, the memory 224 and processor 222 may be integrated. The memory may use any type of volatile or non-volatile storage techniques and mediums. The network I/O device 220 may be a network interface card, a plain old telephone service ("POTS") interface card, an ASCII interface card, a wireless transceiver, or any other suitable network interface device. The registration software 226 may be an a web server application, a compiled program running on a server, a process running on a microprocessor or any other suitable registration software. The message analysis software 228 may be a compiled program running on a server, a process running on a microprocessor or any other suitable registration software.

The registration software 226 is operatively configured to interact with a terminal unit, such as terminal unit 110 from FIG. 1. The registration software 226 is configured to collect a listing of communication device addresses between which communication is restricted. The registration software 226 receives the communication device addresses via the network I/O device 220 and forwards the addresses to message distribution software 210 for storage in the address library 212 of the message management unit 202. In addition, the registration software 226 gathers a listing of restricted identifiers for the received communications device addresses which may be stored in the identifier library 230. The registration software 226 may interact with the terminal unit using a user interface such as, but not limited to, a web page, a compiled program, a text based ASCII terminal or any other suitable user interface.

In one embodiment, the message analysis software 228 queries online servers to update the list of identifiers available in the identifier library 230. As an illustrative example, the identifiers in the identifier library may be words, such as slang words. In this example, the message analysis software 228 queries web sites which store currently listings of slang words including, but not limited to slang dictionary web sites, text message shorthand dictionary and any other online source of current slang or shorthand messaging words. The message analysis software 228 may be configured to compare the contents of each web site with the current contents in the identifier library 230 and to update the contents of the identifier library 230 as needed.

In another embodiment, the registration software 226 may allow a user to configure the message monitoring unit 218. In an illustrative example, a user located at a terminal unit, such as a cellular phone or workstation, may connect to the registration software 226 on the message monitoring unit 218 via the network 214. The registration software 226 may present a user interface to the terminal unit where the user may enter destination communication device addresses as well as communication device addresses which are restricted from communicating with the destination communication device addresses. In addition, the registration software 226 may query the identifier library 230 and present a complete list of all identifiers to a user on the terminal unit. The user may then select the identifiers which will initiate the re-routing of a message containing the identifier sent to a destination communication device address.

Figure 3A:
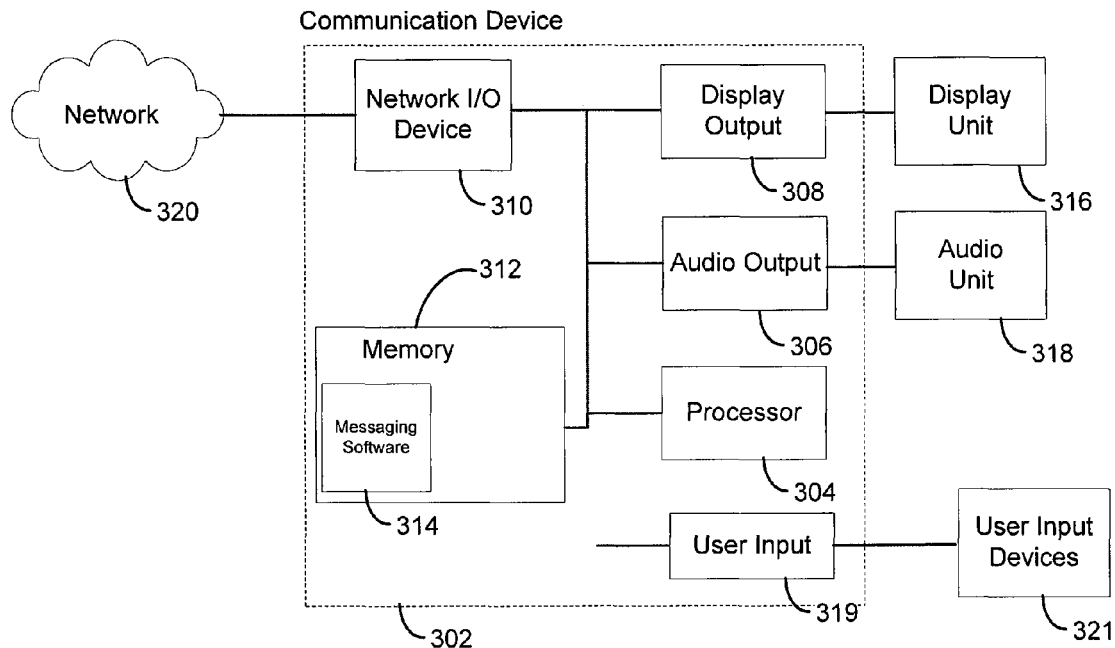
FIG. 3A depicts one embodiment of a communication device consistent with the present invention.

FIG. 3A depicts one embodiment of a communication device 302 consistent with the present invention. The communication device 302 includes a processor 304, an audio output 306, a display output 308, a network I/O device 310, and memory 312 running messaging software 314. The communication device 302 further includes a display unit 316 connected to a display output 308, an audio unit 318 connected to a audio output 306, and a user input 319 connected to a user input device 321, such as but not limited to a mouse or a keypad. The messaging software 314 is operatively configured to send and receive messages over the network 320 via the network I/O device 310. In addition, the processor 304 and messaging software 314 are operatively configured to transmit the message to the display output 308 for presentation on the display unit 316 and also to present an audio tone to the audio output 306 for playing of an audio tone on the audio unit 318.

In one embodiment, the processor 304 may be a central processing unit ("CPU"), a application specific integrated circuit ("ASIC"), a microprocessor or any other suitable processing device. The memory 312 may include a hard disk, random access memory, cache, removable media drive, mass storage or configuration suitable as storage for data, instructions, and information. In one embodiment, the memory 312 and processor 304 may be integrated. The memory may use any type of volatile or non-volatile storage techniques and mediums. The network I/O device 310 may be a network interface card, a plain old telephone service ("POTS") interface card, an ASCII interface card, or any other suitable network interface device. The messaging software 314 may be an a short messaging service ("SMS") program, multimedia messaging service ("MMS"), a compiled program running, a process running on a microprocessor or any other suitable registration software.

In one embodiment, the network 320 may be any private or public communication network known to one skilled in the art such as a Local Area Network ("LAN"), Wide Area Network ("WAN"), Peer-to-Peer Network, Cellular network or any suitable network, using standard communication protocols. The network 320 may include hardwired as well as wireless branches.

Figure 3B:
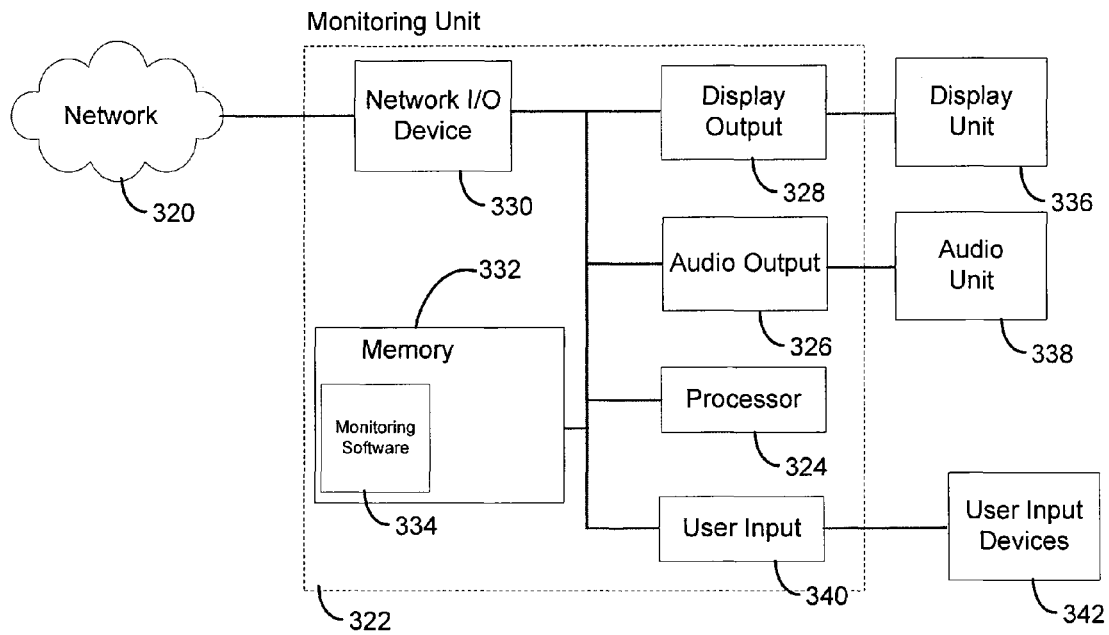
FIG. 3B depicts one embodiment of a monitoring unit consistent with the present invention.

FIG. 3B depicts one embodiment of a monitoring unit 332 consistent with the present invention. The monitoring unit 322 includes a processor 324, an audio output 326, a display output 328, a network I/O device 330, memory 332 running monitoring software 334. The monitoring unit 322 further includes a display unit 336 connected to the display output 328, a audio unit 338 connected to the audio output 326, and a user input 340 connected to a user input device 342, such as but not limited to a keyboard or a mouse. The monitoring software 314 is operatively configured to send and receive messages to and from the message monitoring unit, such as the message monitoring unit 218 of FIG. 2, over the network 320 via the network I/O device 330. In addition, the processor 324 and monitoring software 334 are operatively configured to transmit a message to the display output 328 for presentation on the display unit 336 and also to present a audio tone to the audio output 326 for playing of an audio tone on the audio unit 338.

In one embodiment, the processor 324 may be a central processing unit ("CPU"), a application specific integrated circuit ("ASIC"), a microprocessor or any other suitable processing device. The memory 332 may include a hard disk, random access memory, cache, removable media drive, mass storage or configuration suitable as storage for data, instructions, and information. In one embodiment, the memory 332 and processor 324 may be integrated. The memory may use any type of volatile or non-volatile storage techniques and mediums. The network I/O device 330 may be a network interface card, a plain old telephone service ("POTS") interface card, an ASCII interface card, a wireless transceiver, or any other suitable network interface device. The messaging software 334, may be an a short messaging service program, a compiled program running, a process running on a microprocessor or any other suitable registration software.

In one embodiment, the monitoring unit 322 receives a message from the message monitoring unit via the network 334. The network I/O device 330 routes the message to the messaging software 334. The monitoring software 334 receives a message from the message monitoring software. The monitoring software 334 transmits the message to the display output 328 for display on the display unit 336. A user viewing the message on the display unit 336 has the option of confirming or denying the delivery of the message via the user input device. The monitoring software 334 sends the response received from the user input device 321 to the message monitoring unit 322.

Figure 4:
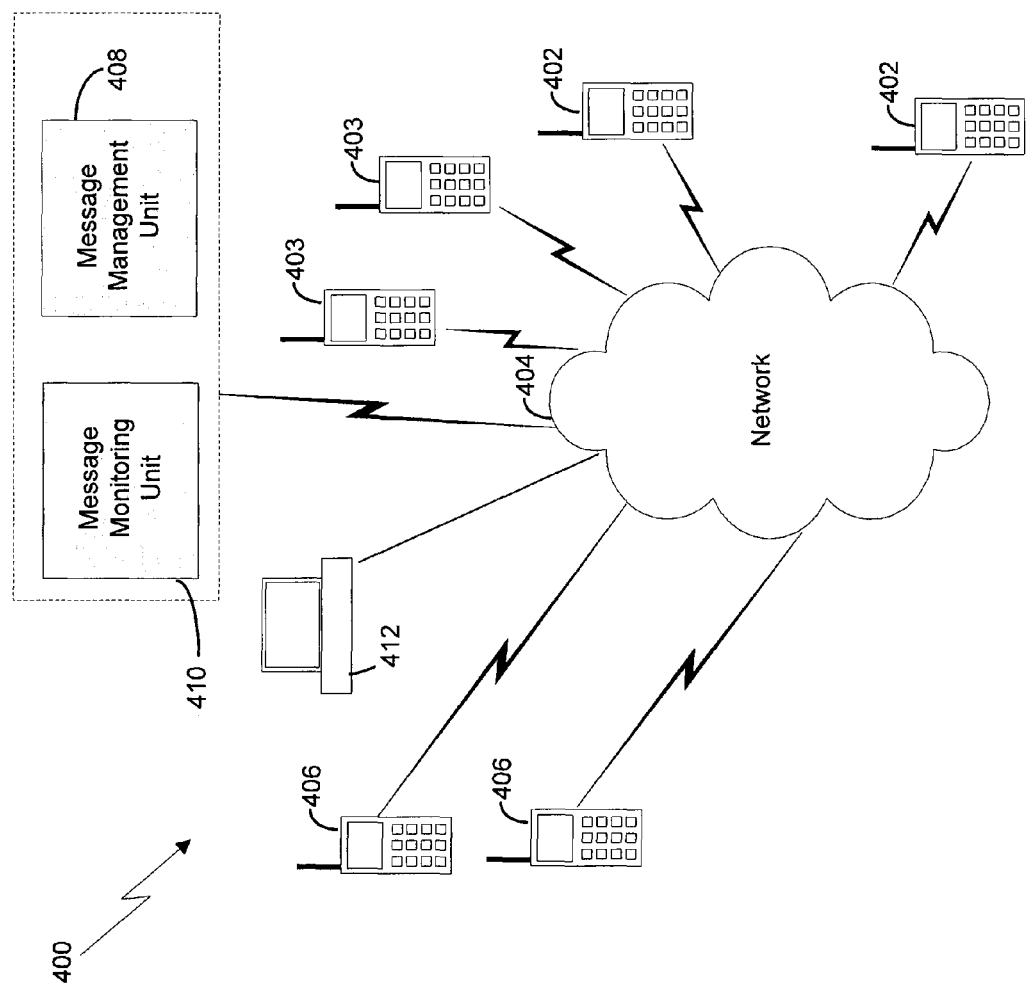
FIG. 4 is an illustrative example of one embodiment of the message filtering system which is consistent with the present invention.

FIG. 4 is an illustrative example of one embodiment of a message filtering system implemented according to the present invention. In this embodiment, a plurality of communications units 402 are connected to a network 404 along with a plurality of monitoring units 406, a message management unit 408, a message monitoring unit 410 and a terminal unit 412. A user may register addresses of communication devices 402 in the message management unit 408. In addition, a user may register addresses of communication devices 403 that are restricted from communicating with the registered communication devices 402. Once the addresses are registered, the user is shown a list of keyword identifiers which the user may select to trigger the re-routing of a message.

When one of the plurality of communication devices 402 transmits a message to another communications unit 403, the message is first transmitted to the message management unit 408. Software operating on the message management unit checks the source communication device 402 address and the destination communication device 403 address with the list of registered communication device 402 addresses and restricted communication device 403 addresses. If the message source address is a restricted communication device 403 address, the message is not sent to the destination communication device 403 address.

If the message is sent from a registered communication device 402 or a non restricted communication device 402, the message is transmitted to the message monitoring unit 410. The message monitoring unit 410 parses the message for identifiers, such as words, and compares each identifier located with a list of identifiers in a identifier database stored in a library on the message monitoring unit 410. If the identifiers in the message match any one identifier in the identifier library, the message is re-routed to at lease one monitoring unit 406. The monitoring unit 406 displays the message and prompts a user to approve the delivery of the message to the destination communication device 403 address. If the user denies the delivery, the message is stored in a message library on the message monitoring unit 410 and is not sent to the destination communication device address 403. If delivery of the message is permitted, the message monitoring unit 410 transmits the message to the message management unit 408 which routes the message to the destination communication device 403 address. In yet another embodiment, the message monitoring unit 410 and monitoring unit 406 are combined into a single device.

Because the message filtering system allows for real time monitoring of messages, messages can be monitored for inappropriate language or content. With the abundance of electronic messages generated each day, having the ability to automatically review and divert questionable messages reduces the time required to manage a data communication system.

In yet another illustrative embodiment, when one of the plurality of communication devices 402 transmits a message to another communications unit 403, the message is first transmitted to the message management unit 408. Software operating on the message management unit checks the source communication device 402 address and the destination communication device 403 address with the list of registered communication device 402 addresses and identified communication device 403 addresses. If the message source address is an identified communication device address or a registered communication device 402 address, the message is sent to the destination communication device address and to at least one message monitoring unit 406. Additional messages sent between the source communication device 402 or destination communication device 403 are mirrored on the message monitoring unit 406. By allowing the mirroring of messages between two communication devices, a parent or a guardian of children is capable of monitoring communications between children and others thereby improving the security of communications between children and others.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A message filtering system comprising:
   a message management unit; and
   a physically separate message monitoring unit in communication with the message management unit over a network, wherein, the message management unit includes:
      a network interface configured to receive a message from a first communication device, the message intended to be delivered to a destination communication device;
      a processor that executes instructions stored in memory to compare an address of the first communication device with a list of addresses stored in an address library to determine if the address of the first communication device is a restricted address,
      the processor being further configured to prohibit communication of the message to the destination communication device if the address of the first communication device is a restricted address,
      the processor being further configured to transmit the message to the message monitoring unit if the address of the first communication device is not a restricted address; and
   the message monitoring unit includes:
      a second network interface configured to receive the transmitted message from the message management unit;
      a second processor that executes instructions to analyze the contents of the one transmitted message for a keywords identifier, the second processor being further configured to execute the following steps if a keyword identifier is identified;
routing a copy of the identified message to a second communication device in real time for delivery approval,
routing the message to the message management unit for delivery to the destination communication device if delivery approval is received from the second communication device,
storing the message in a message library associated with the message monitoring unit and prohibiting transmission of the message to the destination communication device if delivery approval is denied, and wherein;
the second processor is further configured, if no keyword identifier is identified, to route the message to the message management unit for delivery to the destination communication device and to mirror additional messages sent between the first communication device and the second communication device in the message library.

2. The message filtering system of claim 1, further comprising a keyword identifier library located on the message monitoring unit.

3. The message filtering system of claim 2, wherein the message monitoring unit is configured to compare the words of the message with the words contained in the keyword identifier library.

4. The message filtering system of claim 1, wherein the first communication device, second communication, and destination communication devices are one of a cellular phone, a personal data assistant, or a voice over internet protocol phone.

5. The message filtering system of claim 3, wherein the message monitoring unit automatically updates the keyword library with words similar to the words stored in the keyword library.

6. The message filtering system of claim 1, wherein the message monitoring unit stores a sending address of the first communication device that generated declined messages in a restricted address library which is effective to restrict further delivery of messages from the first communication device address to a destination address.

7. A method of filtering messages comprising the steps of:
providing a message management unit;
providing a physically separate message monitoring unit in communication with the message management unit over a network
receiving a short message service message from a first communication device addressed to a destination communication device with the message management unit;
comparing an address of the first communication device with a list of addresses stored in an address library to determine if the address of the first communication device is a restricted address;
prohibiting communication of the message to the destination communication device if the address of the first communication device is a restricted address;
transmitting the message to the message monitoring unit if the address of the first communication device is not a restricted address;
searching the message using a processor of the message monitoring unit for a keyword identifier;
if a keyword identifier is identified;
routing a copy of the identified message to a second communication device in real time for delivery approval,
routing the message to the message management unit for delivery to the destination communication device if delivery approval is received from the second communication device, and
storing the message in a message library associated with the message monitoring unit and prohibiting transmission of the message to the destination communication device if delivery approval is denied;
if a keyword identifier is not identified, routing the message to the message management unit for delivery to the destination communication device and mirroring additional messages sent between the first communication device and the second communication device in the message library.

8. The method of claim 7, wherein the step of searching the message for a keyword identifier further comprises comparing the text of the message with a plurality of keywords identifiers stored in a keyword library on the message monitoring unit.

9. The method of claim 8, wherein the first communication device, second communication, and destination communication devices are one of a cellular phone, a personal data assistant, or a voice over internet protocol phone.

10. The method of claim 8, further comprising the step of storing a sending address of the first communication device that generated the declined message in a restricted address library which is effective to restrict further delivery of messages from the first communication device address.

11. The method of claim 9, wherein the message monitoring unit automatically receives and updates the keyword library with words similar to the words stored in the keyword library.

* * * * *